United States Patent [19]
Tojo et al.

[11] Patent Number: 5,499,132
[45] Date of Patent: Mar. 12, 1996

[54] OPTICAL PASSIVE COMPONENTS

[75] Inventors: Masaaki Tojo, Nara; Noboru Kurata, Ikoma; Hironori Souda, Hirakata, all of Japan

[73] Assignee: Matsushita Electric Industrial Co., Ltd., Osaka, Japan

[21] Appl. No.: 59,762

[22] Filed: May 12, 1993

[30] Foreign Application Priority Data

May 13, 1992 [JP] Japan .................................. 4-120242
Aug. 20, 1992 [JP] Japan .................................. 4-221541

[51] Int. Cl.$^6$ .............................. G02B 5/30; G02B 6/28; G02F 1/09
[52] U.S. Cl. ...................... 359/281; 359/484; 359/495; 372/703; 385/11; 385/27; 385/31; 385/34
[58] Field of Search ................................... 359/281, 282, 359/484, 494, 495, 497; 385/6, 11, 24, 27, 31, 34, 119; 372/703

[56] References Cited

U.S. PATENT DOCUMENTS

| | | |
|---|---|---|
| 4,770,505 | 9/1988 | Okazaki . |
| 4,941,738 | 7/1990 | Olsson . |
| 4,963,003 | 10/1990 | Hiiro ........................................ 359/495 |
| 5,033,830 | 7/1991 | Jameson . |
| 5,044,713 | 9/1991 | Mozer et al. . |
| 5,048,030 | 9/1991 | Hiiro ........................................ 359/495 |
| 5,089,786 | 2/1992 | Tamura .................................... 359/484 |
| 5,299,056 | 3/1994 | Kurata et al. ............................ 359/639 |

FOREIGN PATENT DOCUMENTS

| | | | |
|---|---|---|---|
| 0137327 | 10/1981 | Japan ..................................... 359/495 |
| 58-48019 | 3/1983 | Japan . |
| 59-28116 | 2/1984 | Japan . |
| 0218623 | 11/1985 | Japan ..................................... 359/281 |
| 0205636 | 8/1988 | Japan ..................................... 359/484 |
| 1-155228 | 6/1989 | Japan . |
| 0169423 | 7/1989 | Japan ..................................... 359/484 |
| 2-311829 | 12/1990 | Japan . |
| 4-104216 | 4/1992 | Japan . |

Primary Examiner—Ricky D. Shafer
Attorney, Agent, or Firm—Wenderoth, Lind & Ponack

[57] ABSTRACT

An object of the present invention is to provide an optical passive component having a polarization-independent optical isolator for constituting an optical fiber amplifier and exhibiting an optical isolator function. At least first and second optical fibers for input and output of light rays, a birefringent crystal, a lens for converting the input light rays into nearly collimated rays, a magnetooptical crystal for receiving a magnetic field so as to rotate by $\pi/8+N\pi/4$ ($n=0, 1, \ldots$) the polarization direction of the input light rays, and a reflector are disposed in order. A half wave plate is provided to cover one portion of the ray path between the above described birefringent crystal and the above described lens.

8 Claims, 5 Drawing Sheets

OPTICAL PASSIVE COMPONENTS

BACKGROUND OF THE INVENTION

The present invention generally relates to passive components having an optical isolator function independent of polarization to be used in optical fiber communications, and an optical isolator function for constituting an optical fiber amplifier.

Generally, the optical fiber amplifier inputs the rays of a laser diode of 1480 nm in wavelength into, for example, erbium doped optical fibers so as to excite erbium atoms to a high energy level. When signal lights of approximately 1550 nm in wavelength are inputted into the erbium doped optical fibers, the stimulated emission and radiation of the light equal in wavelength proportional to the size of the signal light is caused so as to amplify the signal lights along the erbium doped optical fibers.

Conventionally, the optical fiber amplifier is composed of a polarized light coupler for obtaining approximately twice as many optical inputs as optical outputs through the polarized coupling of 1480 nm wavelength lights of two pumping laser diodes, an optical multiplexer for inputting the pumping lights into the erbium doped optical fibers, and also, obtaining the lights of approximately 1550 nm in wavelength amplified by the erbium doped optical fibers, a polarization-independent optical isolator for making the light signals transmit only in one way direction so as to prevent the signal lights from being inputted into the erbium doped optical fibers again, because the amplified signal lights of approximately 1550 nm in wavelength are reflected because of some causes, and the optical fibers are advanced in the opposite direction. These optical passive components have optical fibers provided one by one on both the sides of two opposite lenses, with various types of optical materials disposed among the lenses so as to have passive functions. For example, the polarization-independent optical isolator has two crystals, a birefrangible (birefringent) crystal (for example, a rutile crystal) and a magnetooptical crystal (for example, a garnet crystal) provided between two opposite lenses so as to convert into collimated rays with a lens the lights inputted from the optical fibers for transmitting through the above described optical crystals. The polarization-independent optical isolator independent of polarization concentrates the rays with another lens so as to input them into the other optical fiber.

As the above described conventional optical passive components require two lenses or more per optical passive component, the components become more complex. As optical fibers are provided in, at least, two directions, there is a disadvantage that the shape of optical passive component including the draw-around space of the optical fiber becomes larger.

As the optical fibers of the respective optical passive components are in fused spliced connection with respect to each other when the optical fiber amplifier is composed with the use of the optical passive component, a connecting step is required, thus causing a loss increase in the rays because of connections. As space for securing many optical passive components and the accommodation processing space of the optical fibers after the connection are required, the optical fiber amplifier becomes larger.

SUMMARY OF THE INVENTION

Accordingly, the present invention has been developed with a view to substantially eliminating the above discussed drawbacks inherent in the prior art, and has for its essential object to provide an improved optical passive component.

Another important object of the present invention is to provide a smaller optical passive component where optical components to be constituted are reduced in number, and the assembly, optical axis adjustment and so on are easier to effect so as to provide a smaller type of optical fiber amplifier.

In accomplishing these and other objects, according to the optical passive component of the present invention, which has at least first and second (input and output) optical fibers, a birefringent crystal, a lens for converting the input lights into nearly collimated rays, a magnetooptical crystal for rotating the polarized light plane of the input lights by $\pi/8+N\pi/4$ ($n=0, 1, \ldots$), and a reflector disposed in this order, and a half wave plate provided so as to cover one portion of the ray path between the birefrangible (birefringent) crystal and the lens.

The signal lights outputted from the first optical fiber are divided by the birefrangible (birefringent) crystal into two linearly polarized light rays, which are then collimated by the lens. Thereafter, the linearly polarized light rays have their polarized light planes receive rotations of (i.e. the polarization directions of the light rays are rotated by) $\pi/8+N\pi/4$ ($n=0, 1, \ldots$), respectively, in, for example, the left-hand direction by the magnetooptical crystal. The respective linearly polarized light rays are reflected by the reflector to again rotate the polarization directions thereof by $\pi/8 +N\pi/4$ ($n=0, 1, \ldots$) in the same direction as described hereinabove with respect to the magnetooptical crystal. A further rotation of $\pi/4$ in the same direction is caused by the half wave plate. Thereafter, a polarized light coupling operation is effected by the birefrangible crystal so as to input the light rays into the second optical fiber. Thus, the above described arrangement functions as a polarization-independent optical isolator.

As the birefrangible crystal, the lens, and the magnetooptical crystal are used twice with the signal light rays being reflected by the construction, the number of components can be made approximately half with respective to the conventional optical passive component arrangement such that the arrangement can be made smaller and at a lower price. As two optical fibers are mounted in one direction with respect to one lens, an optical fiber array can be constructed. The optical connection can be briefly effected by the optical axis adjustment between the optical fiber array and the lens. As the optical fiber comes out only in one direction, the draw-out area of the optical fiber can be made smaller in the mounting operation of the optical passive component. As a result, the optical fiber amplifier constructed with optical passive components may be smaller in size.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1A:
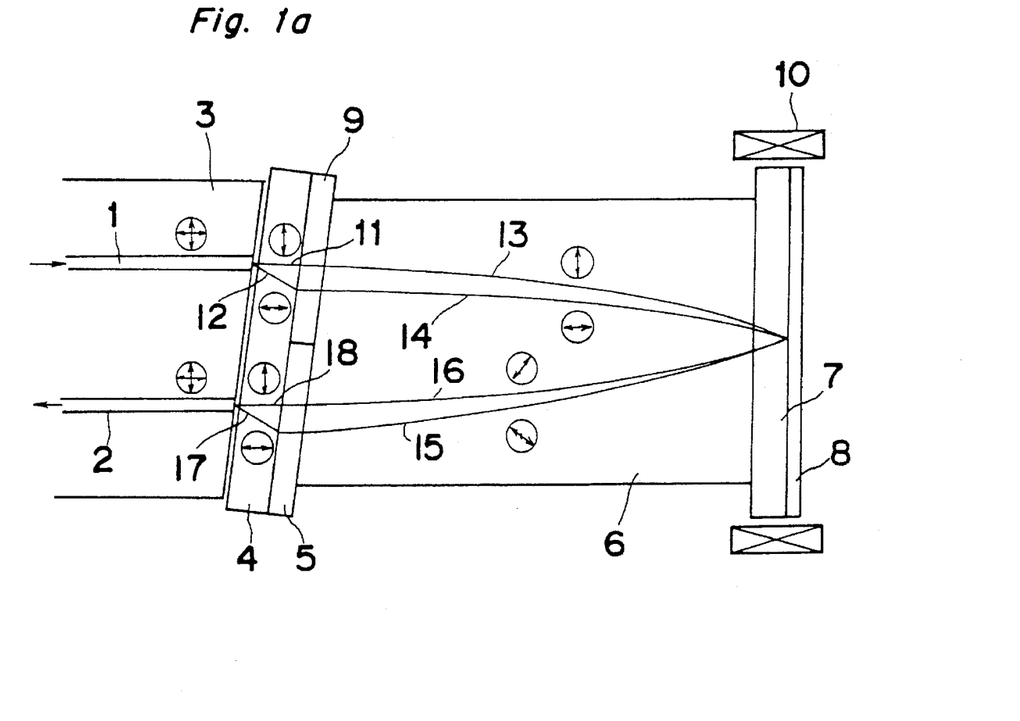
FIGS. 1a and 1b are construction sectional views for illustrating the function of polarization-independent optical isolator in a first embodiment of the present invention.
Figure 1B:
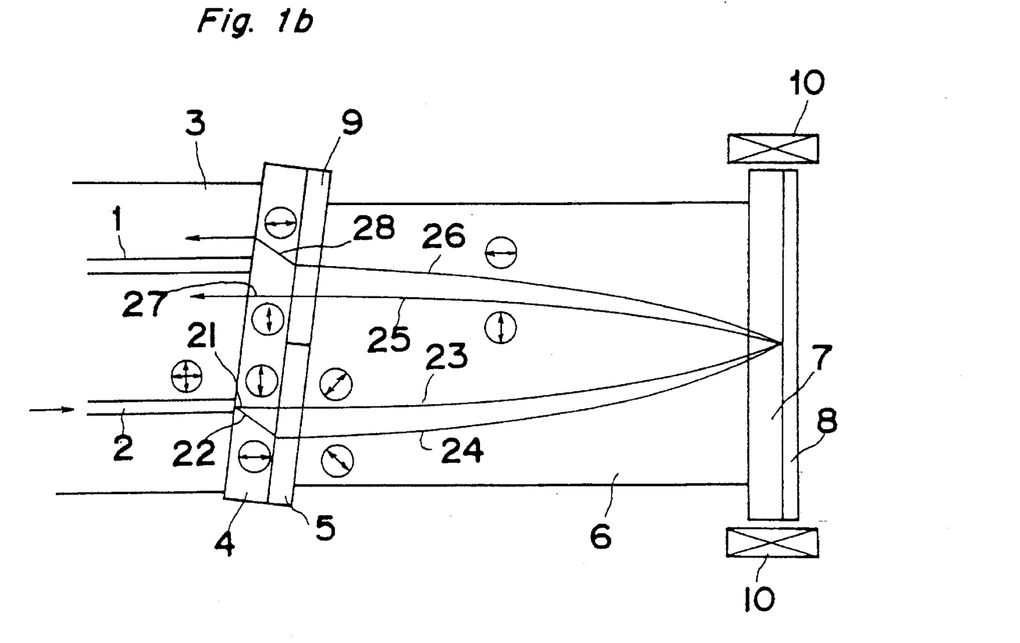

The present invention will be described hereinafter with reference to the drawings. FIGS. 1a and 1b are construction sectional views for illustrating the functions of a polarization-independent optical isolator in a first embodiment of the optical passive component of the present invention. FIG. 1a is a view for illustrating the variation in the polarized light condition and the ray path of the transmission of the light in the regular (or forward) direction. FIG. 1b is a view for illustrating variation in the polarized light condition and the ray path of the transmission of the light in the opposite (or reverse) direction. That is, FIGS. 1a and 1b illustrate the optical paths of the light rays and the polarization directions thereof in forward and reverse directions, respectively.

In FIGS. 1a and 1b, reference numerals 1 and 2 are optical fibers, and reference numeral 3 is an optical fiber array whose tip end is polished at the angle of approximately 8 degrees after the optical fiber 1 and the optical fiber 2 are aligned in parallel and fixedly bonded between two glass plates of 1 mm in thickness. Reference numeral 4 is a birefrangible (birefringent) crystal such as a rutile crystal or the like for dividing the input light into two linearly polarized lights (or light rays), reference numeral 5 is a half wave plate for rotating reversibly by approximately 45 degrees the polarized light plane (i.e. the direction of polarization) of the input light and is composed of rotational crystal or birefrangible crystal, and reference numeral 6 is a grated index type rod-lens where the index is maximum at the central axis for converting the input lights (or input light beams) into collimated lights (or collimated rays) and the index becomes gradually smaller along the radial direction, with the face opposite to the end face of the optical fiber array 3 being polished obliquely at an angle of approximately 8 degrees. Reference numeral 7 is a bismas changed garnet crystal which receives the magnetic field of a cylindrical magnet 10 with a magnetooptical crystal so as to non-reversibly (non-reciprocally) rotate the polarized light plane of the transmission light by 22.5 degrees in a counter clockwise direction. Reference numeral 8 is a reflector, reference numeral 9 is a glass plate as thick as the half wave plate, and reference numerals 11 through 18 and 21 through 28 are lines showing the paths of the rays of light.

The optical isolator independent of polarization of the present invention constructed as described hereinabove will be described hereinafter in its operation. Assume that the light advances in a horizontal direction on the paper face. The polarized light conditions of the lights (i.e. the directions of polarization of the light rays) are shown by arrow marks in circles in the drawings, the polarized light direction within the plane vertical to the opposite face being viewed from the lefthand side. Assume that the clockwise rotation is righthanded, and the counter clockwise rotation is lefthanded. The light condition within the rod lens 6 describes the behavior on the central axis of the light rays.

In FIG. 1a, the non-polarized light inputted from the optical fiber 1 is divided into a normal light ray (e.g. polarization in a first direction) 11 and an abnormal light ray (e.g. polarized in a second direction perpendicular to the first direction) 12 by the rutile crystal 4 so as to change the path of the abnormal light (or light ray) 12. The linearly polarized lights (or light rays) 13, 14 transmitted through the rutile crystal 4 advance along different paths in the same direction, transmit through the glass plate 9, and thereafter are converted into the collimated rays with the right end face of the rod lens 6. As the end faces of the optical fiber array 3 and the rod lens 6 are each polished obliquely at approximately 8 degrees, the lights (light rays) are adapted to not return in the original direction (i.e. in reverse along the original paths) if the lights are reflected by input and output planes of the respective components. When the linearly polarized lights 13 and 14 outputted from the rod lens 6 have passed through the garnet crystal 7, the polarized light plane is rotated by 22.5 degrees in the counter clockwise direction as the light rays are reflected by the reflector 8. As the respective linearly polarized lights reflected with the reflector 8 are transmitted again through the garnet crystal 7 and the polarized light plane also receives the rotation of 22.5 degrees in the counter clockwise direction, the linearly polarized lights 15 and 16 inputted into the rod lens 6 again are transmitted and the polarized light planes rotate to the left respectively by 45 degrees with respect to the linearly polarized lights 13 and 14. The linearly polarized light 13 reflected by the reflector 8 progresses from the linearly polarized light 15, and the linearly polarized light 14 progresses from the linearly polarized light 16.

The linearly polarized lights 15 and 16 are inputted into the half wave plate 5 while being concentrated with the rod lens 6. As the half wave plate 5 is provided so as to cover approximately half of the left-hand end face of the rod lens 6, the polarized light plane rotates further in a counter clockwise direction by 45 degrees when the linearly polarized lights 15 and 16 are transmitted through the half wave plate 5. Therefore, the linearly polarized light 15 which transmits through the half wave plate 5 and is inputted into the rutile crystal 4 becomes the abnormal light 17, and the linearly polarized light 16 becomes the normal light 18, so that the abnormal light 17 and the normal light 18 are coupled on the same optical axis with the rutile crystal 4. As the linearly polarized lights 17 and 18 are concentrated by the rod lens 6, the coupled lights are efficiently input into the optical fiber 2.

In FIG. 1b, the non-polarized light outputted from the optical fiber 2 is divided by the rutile crystal 4 into a normal light (or light ray) 21 and an abnormal light (or light ray) 22 so as to progress along mutually different paths. The linearly polarized lights (or light beams) 23 and 24 which transmit through the half wave plate 5 with the polarized light plane being rotated by 45 degrees in a clockwise direction opposite to the former direction are converted into collimated rays by the rod lens 6. The linearly polarized lights 23 and 24 are transmitted twice through the garnet crystal 7 before and after the linearly polarized lights are reflected by the reflector 8. At this time, the polarized light plane is rotated by 45 degrees in a counter clockwise direction. Therefore, the linearly polarized lights 25 and 26 reflected by the reflection plate 8 and transmitted through the garnet crystal 7 respectively have the polarized light plane direction the same as the above described normal light 21 and abnormal light 22. The linearly polarized lights 25, 26 advance while being concentrated by the rod lens 6, are transmitted by a glass plate 9, and are inputted into the rutile crystal 4 again. As the linearly polarized light 25 is transmitted into the rutile crystal 4 as the normal light 27, and the linearly polarized light 26 is transmitted into the rutile crystal 4 as the abnormal light 28, the linearly polarized light 25 deflects as shown in FIG. 1b so that the beams 27 and 28 are not inputted into the optical fiber 1.

By the above described operation as shown in FIGS. 1a and 1b, the polarization-independent optical isolator is so arranged that the light may be transmitted into the optical fiber 2 from the optical fiber 1 while the light is prevented from transmitting into the optical fiber 1 from the optical fiber 2.

As described hereinabove, the characteristics of the present embodiment are that optical fibers 1 and 2 for input and output, a rutile crystal 4, a rod lens 6 for converting the input lights into nearly collimated rays, a garnet crystal 7 for rotating by 22.5 degrees the polarized light plane of the input light, and a reflector 8 are disposed in order, and a half wave plate 5 is provided so as to cover one portion of the ray paths between the birefrangible crystal and the rod lens 6. The respective optical fibers are disposed so that the lights outputted from the optical fiber 1 may be reflected by the reflector 8 and be inputted into the optical fiber 2. The optical fiber array 3 and the face opposite to the rod lens 6 are polished obliquely so as to constitute a polarization-independent optical isolator.

As the lights are transmitted twice through one rutile crystal 4, one rod lens 6, and one garnet crystal 7 so as to provide the optical isolator function, the number of the components can be made approximately half as many as the conventional polarization-independent optical isolator with an effect that the price may be made lower, and the device may be made smaller.

The two optical fibers 1 and 2 mounted in one direction with respect to the rod lens 6 constitute at least part of the optical fiber array 3. The optical connection may be briefly effected by the optical axis adjustment of the optical fiber array 3 and the rod lens 6. The opposite faces of the optical fiber array 3 and the rod lens 6 are obliquely polished so that the reflected back light can be reduced.

As the optical fiber is mounted only on one, the draw-around area of the optical fiber can be reduced when the optical isolator is mounted. As a result, the optical fiber amplifier constructed by the combination of the optical passive components contributes to the smaller size thereof.

In the present embodiment, it is explained that the garnet crystal 7 will rotate the polarized light plane of the transmission light by 22.5 degrees in a counter clockwise direction. The same effect is obtained if the rotation angle is $\pi/8+N\pi/4$ (n=0, 1, . . . ).

The present embodiment has been described as using the rod lens 6 as a lens. A spherical lens or an aspherical lens may also be used. The reflector 8 is described as a reflector for completely reflecting the lights. A reflector which reflects only a selected specific wavelength may also be used.

In the discussion of the present embodiment, description of the input and output planes of the respective lights of the optical fiber array 3, the rutile crystal 4, the half wave plate 5, the rod lens 6, the garnet crystal 7, the reflection plate 8, and the space among the respective members is omitted. An anti-reflection coating may be applied on the input and output planes of the respective lights. It is needless to say that the space, if an air layer, may be filled with a transparent material of an index matching material.

Figure 2:
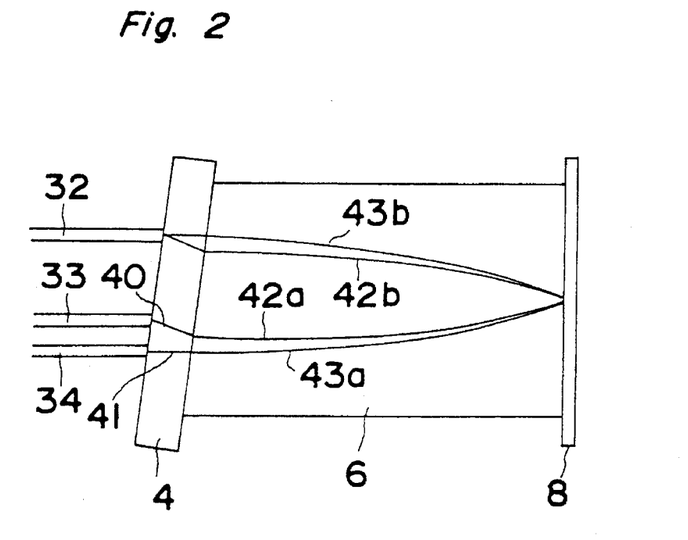
FIG. 2 is a construction sectional view for illustrating the construction of a polarized light coupler in a second embodiment of the present invention.

A second embodiment of the present invention will be described hereinafter with reference to FIG. 2. FIG. 2 shows a diagram of a polarized light coupler in a second embodiment of the present invention. In FIG. 2, reference numeral 32 is an optical fiber, and reference numerals 33 and 34 are polarization maintained optical fibers. Reference numeral 4 is a birefrangible crystal such as a rutile crystal or the like which divides the input light into two linearly polarized lights with polarized light planes going straight with respect to each other, and reference numeral 6 is a grin rod lens wherein the index is largest at the central axis for converting the input light into collimated rays and the index becomes gradually smaller in the radial direction. Reference numeral 8 is a reflector, and reference numerals 40 through 43 are lines showing the paths of the rays of lights.

A polarized light coupler constructed as described hereinabove will be described in its operation. For example, a laser diode is connected to the ends of the polarization maintained optical fibers 33, 34, and the linearly polarized light beams with the polarized light plane going straight with respect to each other is inputted into the rutile crystal 4 from the respective polarization maintained optical fibers 33, 34. The polarized light directions of the optical fibers 33 and 34 are disposed so that the light outputted from the polarization maintained optical fiber 33 may become abnormal light 40 in the rutile crystal 4, and the light outputted from the polarization maintained optical fiber 33 may become normal light 41 in the rutile crystal 4. The normal light 41 goes straight through the rutile crystal 4, and the abnormal light 40 progresses obliquely into the rutile crystal 4 and is outputted from a position offset by a constant length proportional to the thickness of the rutile crystal 4 as compared with a case where the light goes straight. The abnormal light 40 and the normal light 41 outputted from the rutile crystal 4 are inputted into the rod lens 6 from the position slightly offset from the central axis of the rod lens 6, progress respectively along the ray paths 42a and 43a, and are converted into collimated rays at the other end of the rod lens 6.

These linearly polarized lights are reflected by the reflector 8 and progress through the rod lens 6 in accordance with the paths 42b and 43b while being concentrated. The light 42a progresses from the light 42b and the light 43a progresses from the light 43b. The above described abnormal light 40 and normal light 41 are outputted from a position of the lens axis symmetry where the above described abnormal light 40 and the normal light 41 are inputted into the rod lens 6. The polarized light direction of the light 43b inputted into the rutile crystal 4 again is transmitted into the rutile crystal 4 as the normal light, and the polarized light direction of the light 42b is transmitted into the rutile crystal 4 as the abnormal light. The abnormal light progresses obliquely as described above. The normal light and the abnormal light are coupled on the same optical axis and are inputted into the optical fiber 32.

The interval between the polarization maintained optical fibers 33 and 34 is set such that the linearly polarized light beams 42b and 43b progressing into the rod lens 6 are coupled on the same optical axis by the rutile crystal 4. Namely, the interval is set approximately twice as large as the positional offset caused by the oblique transmission of the abnormal light by the rutile crystal 4.

The linearly polarized light beams outputted from the polarization maintained optical fibers 33, 34 are coupled by the above described operation so as to construct the polarized light coupler to be connected to the optical fiber 32.

The characteristics of the present embodiment are that two polarization maintained optical fibers 33, 34 and one optical fiber 32, a rutile crystal 4, a rod lens 6 for converting the input light into nearly collimated rays, and a reflector 8 are disposed in order, and further that the linearly polarized lights with the polarized light planes going straight with respect to each other outputted from the two polarization maintained optical fibers 33, 34 are reflected by the reflector 8, and thereafter two polarization maintained optical fibers 33, 34 and one optical fiber 32 are arranged so that the linearly polarized lights are coupled on the same optical axis by the rutile crystal 4 and may be inputted into the optical fiber 32 so as to construct a polarized light coupler.

As the light is transmitted twice through one rutile crystal 4 and one rod lens 6 so that the construction has a polarized light coupling function, the number of the lenses to be used can be made one third that of the conventional polarized light coupler with an effect of making the price lower and the size smaller.

As the three optical fibers 32 through 34 are mounted in one way direction with respect to the rod lens 6, an optical fiber array with three optical fibers 32 through 34 being arranged in parallel can be constructed as in the embodiment shown in FIG. 1 and the optical connection can be briefly made by the optical axis adjustment of the optical fiber array and the rod lens 6. If the opposite faces of the optical fiber array and the rod lens 6 are constructed with the opposite faces being obliquely polished at approximately 8 degrees in mutual parallel, the reflected back light can be reduced.

As three optical fibers come out in one way, the draw-around area of the optical fiber can be reduced when the polarized light coupler is mounted. As a result, the optical passive components contribute toward a smaller size of the optical fiber amplifier.

The rod lens 6 has been described as the lens in the present embodiment, but a spherical lens or an aspherical lens may be used. Although the reflector 8 is described as being a complete reflector of the light, it functions as a polarized light coupler having the wavelength selecting function if a reflector for selecting and reflecting the specific wavelength is selected.

Although the input and output faces of the respective lights of the rutile crystal 4, the rod lens 6, the reflection plate 8 and the space among the respective members are omitted in the description, an anti-reflection coating may be applied upon the input and output faces of the respective lights. It is needless to say that the space may be filled up with a transparent material of index matching material, even in the air layer.

A third embodiment of the present invention will be described hereinafter with reference to the drawings. The present embodiment provides an optical passive component having the optical passive functions of an optical isolator for use in an optical fiber amplifier in which the polarized light coupler and the optical multiplexer are integrated.

Figure 3:
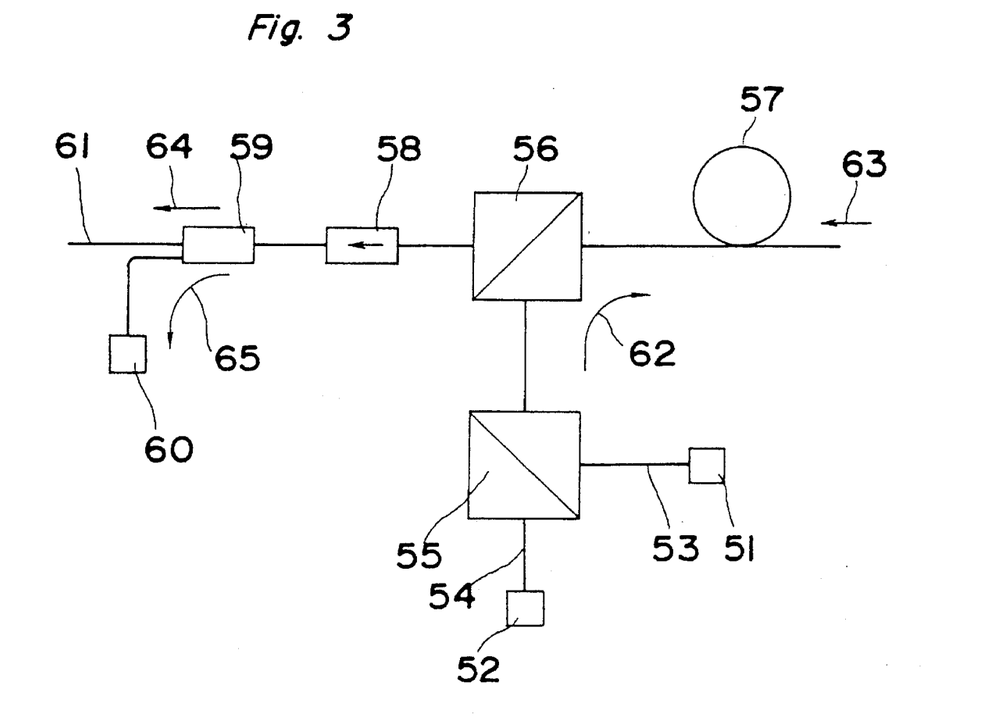
FIG. 3 is a basic block diagram of an optical fiber amplifier with the conventional optical passive components being assembled.

The construction of the optical fiber amplifier will be described before the present embodiment is described. FIG. 3 is a view showing the construction of the optical fiber amplifier with the conventional optical passive components being combined with it. In FIG. 3, light beams of 1480 nm in wavelength outputted into the polarization maintained optical fibers 53 and 54 from the laser diodes 51 and 52 are coupled by the polarized light coupler 55 and are inputted into an erbium doped optical fiber 57 through an optical multiplexer 56 in the direction shown by arrow 62. The optical multiplexer 56 is adapted to couple or divide light beams of 1480 nm in wavelength and 1550 nm in wavelength. The inputted light of 1480 nm is absorbed by the erbium doped optical fiber 57 so as to excite the erbium atoms to a high energy level. When the signal light 63 of 1550 nm in wavelength is inputted into the erbium doped optical fiber 57, the stimulated emission and radiation of the light of the same wavelength proportional to the size of the inputted signal light 63 is caused and the output of the signal light is amplified along the erbium doped optical fiber 57. The amplified signal light is transmitted through the optical multiplexer 56, and thereafter, passes to the optical isolator 58 and the optical divider 59 and is outputted as the optical signal 64 from the optical fiber 61. The optical detecting device 60 detects one portion 65 of the amplified optical signal divided by the optical divider 59, and monitors the size of the amplified optical signal so as to control the optical output of the laser diodes 51 and 52. The conventional optical fiber amplifier is constructed as described hereinabove.

Figure 4:
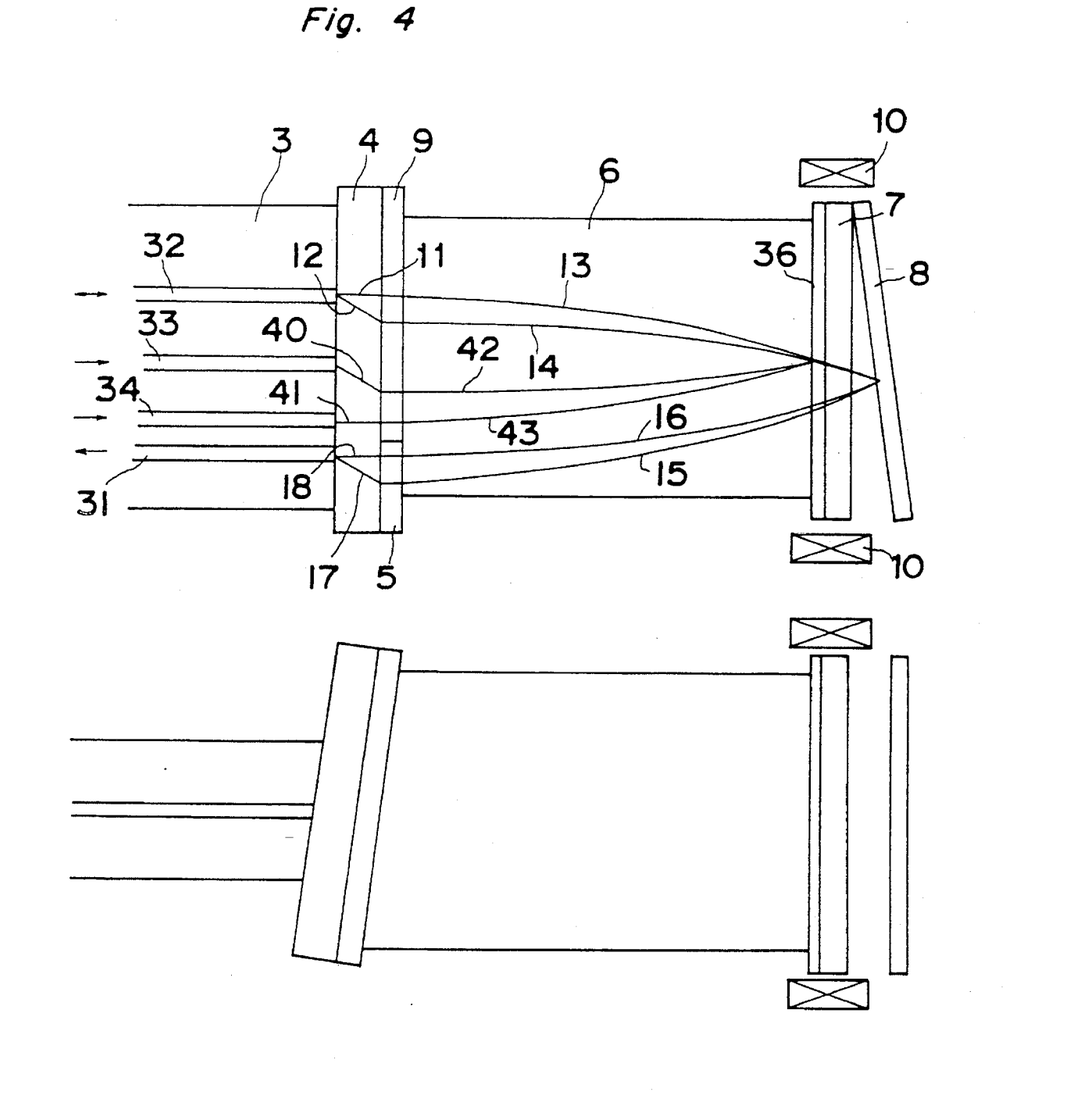
FIG. 4 is a sectional view for illustrating the construction of an optical passive component in a third embodiment of the present invention.

FIG. 4 is a view showing a third embodiment of the present invention for illustrating the construction of the optical passive components with the optical isolator 58, the polarized light coupler 55, and the optical multiplexer 56 of the optical fiber amplifier described in FIG. 3 being integrated.

In FIG. 4, reference numerals 31 and 32 are optical fibers, and reference numerals 33 and 34 are polarization maintained optical fibers. Reference numeral 3 is an optical fiber array where the optical fibers 31, 32 and the polarization maintained optical fibers 33, 34 are arranged in parallel and the tip end is polished obliquely at approximately 8 degrees after the bonding and fixing operation between two glass plates of 1 mm in thickness. Reference numeral 4 is a birefrangible crystal such was a rutile crystal or the like for dividing the input light into two linearly polarized lights with the polarized light planes going straight with respect to each other. Reference numeral 5 is a half wave plate which reversibly rotates by approximately 45 degrees the polarized light plane of the input light and is composed of a rotational crystal or a birefrangible crystal. Reference numeral 9 is a glass plate equal in thickness to the half wave plate 5. Reference numeral 6 is a grin rod lens where the index is maximum at the central axis for converting the input light into the collimated rays and the index becomes gradually smaller in the radial direction, and has a face opposite to the end face of the optical fiber arrays 3 which is polishing obliquely at approximately 8 degrees. The end face of the optical fiber array 3 and the rod lens 6 are respectively polished obliquely at approximately 8 degrees and the rutile crystal 4, the half wave plate 5, and the glass plate 9 are provided in parallel to the end face. The reflection lights are adapted not to return to the original direction by the refection of the light by the input and output faces of the respectively lights.

Reference numeral 36 is a wave length filter for reflecting the light of 1480 nm in wavelength, and transmitting the light of 1550 nm in wavelength. Reference numeral 7 is a bismas changed garnet crystal, which receives the magnetic field of the cylindrical magnet 10 with a magnetooptical crystal so as to unreversibly rotate by 22.5 degrees in the counter clockwise direction the polarized light plane of the transmission light. Reference numeral 8 is a reflector provided obliquely with respect to the optical axis, and reference numerals 11 through 18 and reference numerals 40 through 43 are lines showing the paths of the rays of light.

The optical passive component of the present invention constructed as described hereinabove will be described hereinafter in its operation. The present embodiment is of a construction wherein the polarization-independent optical isolator and the polarized light coupler described in the embodiment of FIG. 1 and FIG. 2 are integrated. The light is adapted to progress in the horizontal direction of the paper face, and the polarized light direction of the light is expressed with respect to a plane vertical to the paper face being seen from the left hand side, as in the embodiment of FIG. 1.

The linearly polarized light rays outputted from the polarization maintained optical fibers 33, 34 of the optical fiber array 3, are inputted to the rutile crystal 4. The two linearly polarized lights have wavelengths of 1480 nm and respectively become an abnormal light 40 and a normal light 41 in the rutile crystal 4. The normal light 41 goes straight into the rutile crystal 4 and the abnormal light 40 progresses obliquely into the rutile crystal 4 so as to be output therefrom at a position offset by a constant length proportional to the thickness of the rutile crystal 4. The abnormal light 40 and the normal light 41 outputted from the rutile crystal 4 are transmitted through the glass plate 9, are thereafter inputted into the rod lens 6 from a position offset slightly from the central axis of the rod lens 6, progress respectively in the paths 42 and 43 and are converted into collimated rays at the other end of the rod lens 6.

These linearly polarized lights are reflected by the wavelength filter 36 and progress in the paths 14 and 13 into the rod lens 6 while being concentrated again. The wavelength filter 36 reflects the light of 1480 nm in wavelength and has characteristics of letting the light of 1550 nm in wavelength transmit. The light 42 progresses from the light 14, and the light 43 progresses from the light 13 by the reflection of the wavelength filter 36. The above described abnormal light 40 and normal light 41 are inputted from a position of the lens axis symmetry into the rod lens 6. The polarized light direction of the light 13 transmitting through the glass plate 9 and inputted into the rutile crystal 4, is again transmitted into the rutile crystal 4 as the normal light 11. The polarized light 14 is transmitted into the rutile crystal 4 as the abnormal light 12. Therefore, the abnormal light 12 as described above progresses obliquely, and the normal light 11 and the abnormal light 12 are coupled on the same optical axis and then inputted into the polarization maintained optical fiber 32.

The interval between the polarization maintained optical fibers 33 and 34 is set such that the inputted normal light 11 and the abnormal light 12 are coupled on the same optical axis in the rutile crystal 4, namely, to a size approximately twice as great as the length of the positional offset by the oblique transmission of the abnormal light in the rutile crystal 4.

The linearly polarized light outputted from the polarization maintained optical fibers 33, 34 are coupled as in the embodiment of FIG. 2 by the above described operation for input to the optical fiber 32.

The non-polarized light of 1550 nm in wavelength outputted from the optical fiber 32 of the optical fiber array 3 is divided by the rutile crystal 4 between the normal light 11 and the abnormal light 12 so as to change the path of the abnormal light 12. The linearly polarized lights 13 and 14 transmitting through the rutile crystal 4 progress along different paths in the same direction, are transmitted through the glass plate 9, and thereafter are converted into the collimated rays in the right end face of the rod lens 6.

The linearly polarized lights 13 and 14 outputted from the rod lens 6 are transmitted through the wavelength filter 36 and are inputted into the garnet crystal 7. The polarized light planes of the respective linearly polarized light receive the rotation of 22.5 degrees in the counter clockwise direction when the garnet crystal 7 has transmitted, and the linearly polarized lights are reflected by the reflector 8. As the respective linearly polarized lights reflected by the reflector 8 are transmitted through the garnet crystal 7 again and polarized light planes also receives the rotation of 22.5 degrees in the counter clockwise direction, the linearly polarized lights 15 and 16 inputted into the rod lens 6 again transmit, the polarized light planes are rotated respectively by 45 degrees in the counter clockwise direction with respect to the linearly polarized lights 13 and 14. The reflector 8 is provided inclined with respect to the optical axis, and the reflected linearly polarized light 13 progresses from the linearly polarized light 15, and the linearly polarized light 14 progresses from the linearly polarized light 16.

The linearly polarized lights 15 and 16 are transmitted through the wavelength filter 36 and are inputted into the half wave plate 5, while the linearly polarized lights are being concentrated with the rod lens 6. As the half wave plate 5 is provided to cover one portion of the right end face of the rod lens 6, the polarized light plane rotates 45 degrees further in the counter clockwise direction when the linearly polarized lights 15 and 16 are transmitted through the half wave plate 5. The linearly polarized light 15 which is transmitted through the half wave plate 5 and is inputted into the rutile crystal 4 becomes an abnormal light 17, and the linearly polarized light 16 becomes a normal light 18. The abnormal light 17 and the normal light 18 are coupled on the same optical axis with the rutile crystal 4. As the linearly polarized lights 17 and 18 are concentrated by the rod lens 6, the coupled light is input efficiently to the optical fiber 31.

The light of the non-polarized light of 1550 nm in wavelength outputted from the optical fiber 31 is divided by the rutile crystal 4 into the linearly polarized lights, thereafter the polarized light planes are rotated by 45 degrees in the clockwise direction by the half wave plate 5. The light is transmitted twice through the garnet crystal 7 with the polarized light plane being rotated by 45 degrees in the counter clockwise direction. As the linearly polarized light 13 inputted into the rutile crystal 4 again is transmitted through the rutile crystal 4 as the abnormal light, and the linearly polarized light 14 is transmitted through the rutile crystal 4 as the normal light, the light is not inputted into the optical fiber 1 without being coupled on the same optical axis.

The light is transmitted from the optical fiber 32 to the optical fiber 31 as described in the embodiment of FIG. 1 by the above described operation. The isolator functions as a polarization-independent optical isolator for cutting off the transmission of light from the optical fiber 31 to the optical fiber 32.

The optical passive component of the present embodiment functions as a polarized light coupler, an optical isolator independent of polarization and an optical multiplexer for constituting the optical fiber amplifier described in FIG. 3 when the optical fiber 31 outputs of the optical signal having an amplified wavelength of 1550 nm, the erbium doped optical fiber is connected with the other end of the optical fiber 32, and the 1480 nm wavelength input light from the laser diode is connected with the polarization maintained optical fibers 33, 34.

The characteristics of the present embodiment are that the optical fibers 31, 32 and the polarization maintained optical fibers 33, 34, the rutile crystal 4, the rod lens 6, the wavelength selecting filter 36, the garnet crystal 7 for receiving the magnetic field and rotating by 22.5 degrees the polarized light plane of the input light, and the reflection plate 8 which is tilted with respect to the optical axis are arranged in this order, and the half wave plate 5 is provided to cover one portion of the ray path between the rutile crystal 4 and the rod lens 6.

The linearly polarized light rays outputted from the polarization maintained optical fibers 33, 34 are reflected by the wavelength selection filter 36, thereafter are coupled on the same optical axis by the rutile crystal 4, and are inputted into the optical fiber 32. The optical fibers 31, 32 and the polarization maintained optical fibers 33, 34 are arranged so that the light of 1550 nm is wavelength outputted from the optical fiber 32 may be reflected by the reflection plate 8, transmitted through the half wave plate 5, and inputted into the optical fiber 31.

As the construction allows the polarized light coupler for constituting the optical fiber amplifier, the optical isolator independent of polarization and the optical multiplexer to function as three optical passive components, the number of the components can be made half or less as many as in the conventional construction, with an effect that the price is made lower, the device is made smaller.

As the four optical fibers 31 through 34 are mounted in one direction with respect to the rod lens 6, the optical fiber array 3 can be constructed, so that the optical connection can be effected easily by the optical axis adjustment between the optical fiber array 3 and the rod lens 6. As the faces opposite to the optical fiber array 3 and the rod lens 6 are obliquely polished at approximately 8 degrees, there is an effect that the reflected back light can be reduced.

As the optical fiber comes out in only one way, the draw-around area of the optical fiber can be reduced when the optical passive components are mounted. This contributes to the smaller size of the optical fiber amplifier constructed with the optical passive components.

If the rotation angle is $\pi/8+N\pi/4$ (n=0, 1, ...) as in the embodiment shown in FIG. 1, the same effect can be obtained although the garnet crystal 7 is described in the present embodiment as causing the polarized light plane of the transmission light to be unreversibly rotated by 22.5 degrees in the counter clockwise direction.

Although the polarization-independent optical isolator of the present embodiment is described as transmitting the light from the optical fiber 32 to the optical fiber 31, a polarization-independent optical isolator which transmits the light to the optical fiber 32 from the optical fiber 31 so as to cut off the opposite direction if the polarized light plane of the light passing into the garnet crystal 7 is in the clockwise direction with the polarity of, for example, the magnet 10 being reversed.

Although the rod lens 6 is used as a lens in the present embodiment, a spherical lens or an aspherical lens may be used. Although descriptions of the input and output faces of the respective lights of the optical fiber array 3, the rutile crystal 4, the half wave plate 5, the rod lens 6, the wavelength selecting filter 36, the garnet crystal 7, the reflection plate 8, and the space among the respective members has been omitted, an anti-reflection coating may be applied on the input and output faces of the respective lights. It is needless to say that the space may be filled up with a transparent index matching material.

Figure 5:
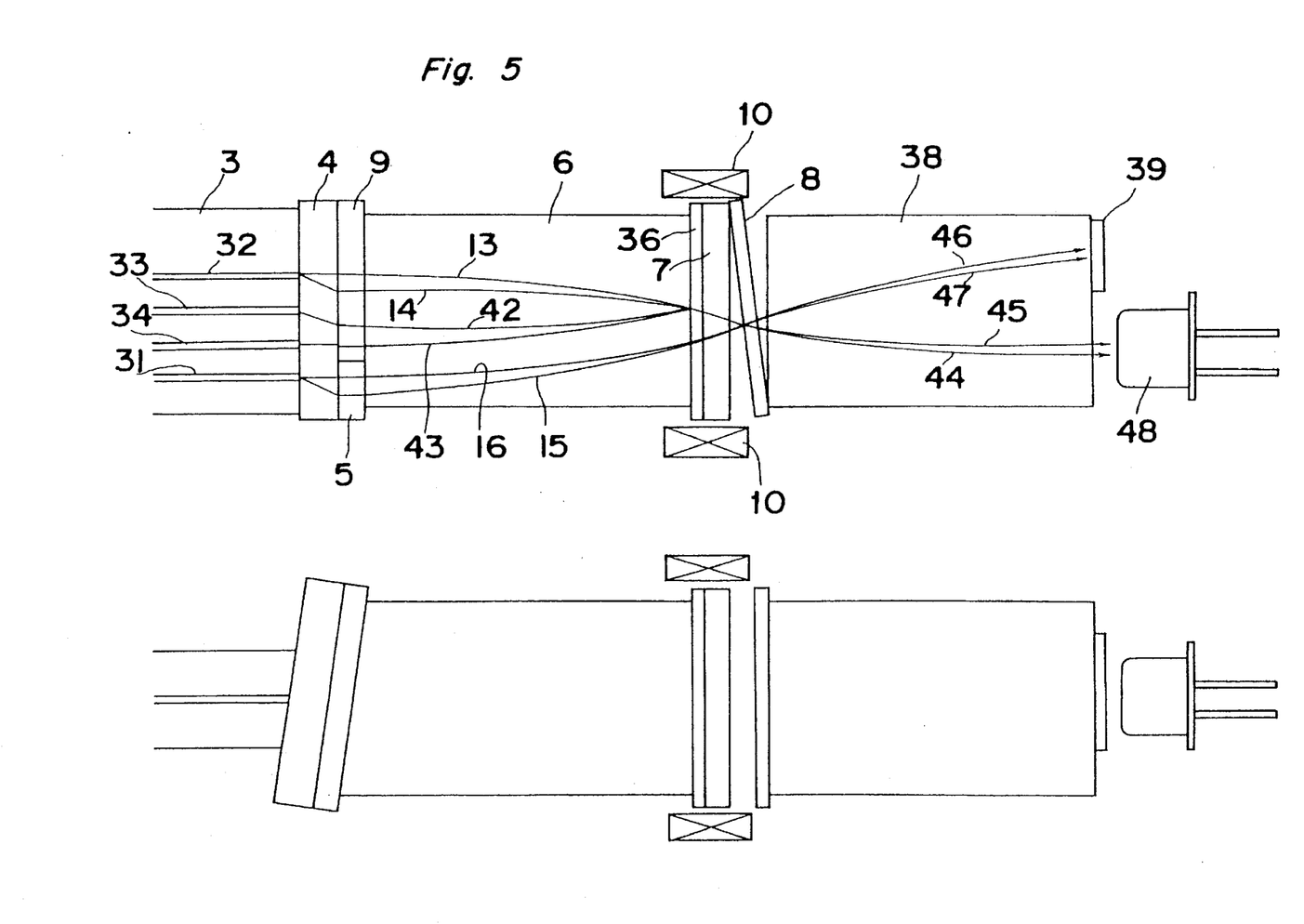
FIG. 5 is a sectional view for illustrating the construction of an optical passive component in a fourth embodiment of the present invention.

A fourth embodiment of the present invention will be described hereinafter with reference to the drawings. FIG. 5 shows the construction of the optical passive component in the fourth embodiment of the present invention. The present embodiment provides an optical passive component in which the optical passive functions of a polarization-independent optical isolator for constituting the conventional optical fiber amplifier described in FIG. 3, the polarization light coupler, the optical multiplexer, the optical coupler, and the optical detecting device are integrated.

In FIG. 5, reference numeral 8 is a reflector for transmitting one portion of the inputted light therethrough, and reference numeral 38 is a grin rod lens for concentrating the collimated rays inputted by the reflector 8. Reference numeral 39 is a cover plate for absorbing the light, reference numeral 48 is an optical detecting device for detecting the light, and reference numerals 44 through 47 are lines showing the light paths. In FIG. 5, it is noted that elements corresponding in construction or function to those in the embodiment shown in FIG. 4 are designated by like reference numerals and the description thereof is omitted.

The differences between the present embodiment and the embodiment shown in FIG. 4 are that the reflector 8 functions to transmit therethrough one portion of the inputted light, a rod lens 38 is provided for concentrating the transmitted light, an optical detecting device 48 is provided for detecting the light of the one portion, a cover plate is provided for absorbing the other concentrated lights os so to cut them off.

The optical passive component constructed as described hereinabove will be described in its operation with the use of FIG. 5. In describing the present embodiment, the description of the construction of the optical passive component which operates as the polarization-independent optical isolator, the polarized light coupler, and the optical multiplexer described in connection with FIG. 4 will be simplified, because the same operation is effected in the present embodiment.

As described for the embodiment shown in FIG. 4, a polarization-independent optical isolator is constructed which transmits light to the optical fiber 31 from the optical fiber 32 of the optical fiber array 3, but does not transmit light to the optical fiber 32 from the optical fiber 31. The linearly polarized lights 13, 14 which are outputted from the optical fiber 32, are converted into the collimated rays at the other end of the rod lens 6, and are inputted to the reflector 8 tilted with respect to the optical axis after being transmitted through the wavelength selecting filter 36 and the garnet crystal 7. The reflector 8 has the characteristics of allowing, for example, approximately 1% of the light to transmit, and the other light to reflect so that the reflected light becomes the linearly polarized lights 15, 16 and are inputted into the optical fiber 31. The linearly polarized lights 44, 45 transmitted through the reflector 8 are inputted to the rod lens 38. As the rod lens 38 has the characteristics of concentrating the inputted collimated rays, the collimated linearly polarized lights 44, 45 are concentrated at the other end of the rod lens 38 and are inputted into the optical detecting device 48.

Although the lights 15, 16 outputted from the optical fiber 31 are reflected by the reflector 8 as in the above description, the light of one portion is transmitted through the reflector 8 and is inputted into the rod lens 38. The inputted linearly polarized lights 46, 47 are concentrated at the other end of the rod lens 38, and are inputted and absorbed by the cover plate 39 provided on the end face of the rod lens 38.

The function as an optical coupler for dividing one portion of the light inputted from the optical fiber 32 and an optical detecting device for monitoring the light as described above. The cover plate 39 is provided to avoid the inputting operation, into the optical detecting device 48, of the light outputted from the optical fiber 31.

The characteristics of the present embodiment are that the reflector 8 has a function of transmitting one portion of the input light in the construction of the embodiment shown in FIG. 4, has a second rod lens 38 for concentrating the collimated rays passing through the reflector 8, and an optical detecting device 48 for detecting the concentrated lights. A light cover plate 39 for cutting off the light outputted from the optical fiber 31 and passing through the reflector 8 is provided.

In the above described construction, the optical passive component of the present embodiment functions as a polarized light coupler, a polarization-independent optical isolator, an optical multiplexer, an optical coupler, an optical detecting device for constituting an optical fiber amplifier as explained in connection with FIG. 3 if the optical fiber 31 is provided as an output end of the amplified 1550 nm wavelength optical signal with the erbium doped optical fiber being connected with the other end of the optical fiber 32 and the 1480 nm wavelength output light from the laser diode being connected with the polarization maintained optical fibers 33, 34.

An optical coupler for coupling portions of the light outputted from the optical fiber 32 and an optical detecting device for monitoring the light are provided. In addition to the effect obtained from the construction of the embodiment of FIG. 4, the number of the components may be made half or less as the conventional optical passive components, with an effect that the price may be made lower, and the size can be made smaller.

In the present embodiment, it is described that monitoring of the light from the optical fiber 32 is carried out. The effect of monitoring the light of the optical fiber 31 can be obtained if the light cover plate 39 is replaced by an optical detecting device 48.

The light cover plate 39 in the present embodiment is described as a member for absorbing light. Anything which cuts off the progress of the light and prevents its input to the optical detecting device can be used.

Figure 6:
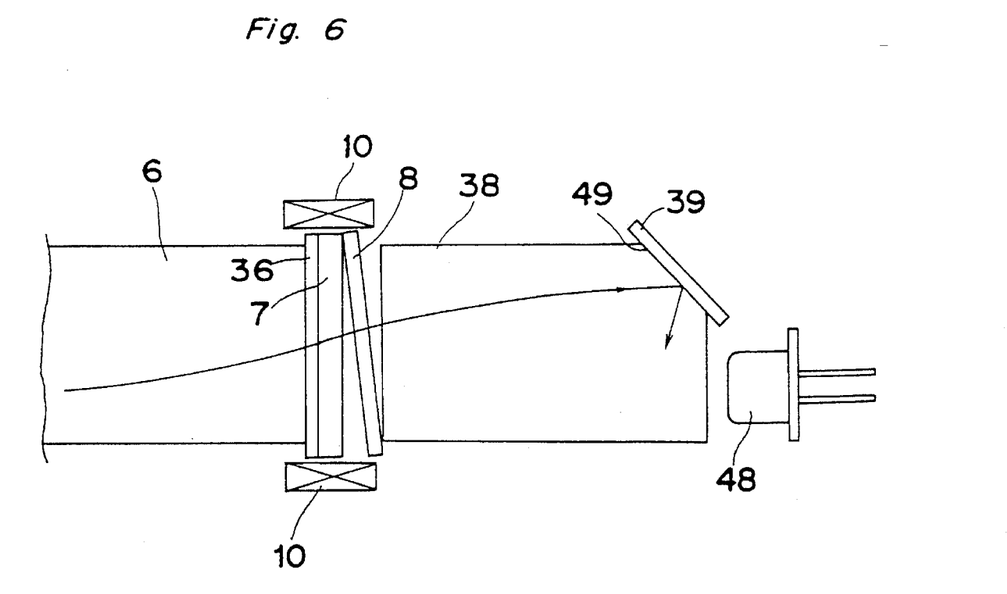
FIG. 6 is a sectional view for illustrating an essential portion of the other construction of an optical passive component in the fourth embodiment.

Preferably, if the end face 49 for providing the light cover plate 39 of the rod lens 38 is obliquely cut as shown in FIG. 6, an effect of preventing the reflected back light from being caused is obtained without the reflection light being returned in the original direction as shown in FIG. 6 when the light is not completely absorbed by the light cover plate 39. If the oblique end face 49 is constructed such that the inputted light may be totally reflected, an optical fiber amplifier can be constructed with there being less reflected back light, which causes noise, without the requirement of the light cover plate 39.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An optical component comprising:

first and second optical fibers;

a reflector;

a birefringent crystal disposed between said reflector and said first and second optical fibers;

a lens disposed between said reflector and said birefringent crystal;

a magnetooptical crystal disposed between said reflector and said lens;

a half-wave plate disposed between said lens and said birefringent crystal in a location between said lens and said second optical fiber, no half-wave plate being disposed between said lens and said first optical fiber;

wherein said lens is operable to substantially collimate light rays input thereinto; and wherein said magnetooptical crystal is operable to receive a magnetic field and to rotate polarization directions of light rays input thereinto by $\pi/8+N\pi/4$, (N=0, 1, . . . ).

2. An optical component as recited in claim 1, wherein said first optical fiber is operable to transmit light toward said reflector, and said second optical fiber is operable to receive light; and said first and second optical fibers are disposed such that the light transmitted from said first optical fiber does not pass through a half-wave plate until after the light has been reflected by said reflector, after which the light passes through said half-wave plate and said birefringent crystal and into said second optical fiber.

3. An optical component as recited in claim 1, wherein said half-wave plate is operable to rotate polarization directions of light rays input thereinto by 45 degrees.

4. An optical component comprising:

first and second optical fibers;

a reflector;

a birefringent crystal disposed between said reflector and said first and second optical fibers;

a lens disposed between said reflector and said birefringent crystal;

a magnetooptical crystal disposed between said reflector and said lens;

a half-wave plate disposed between said lens and said birefringent crystal in a location between said lens and said second optical fiber, no half-wave plate being disposed between said lens and said first optical fiber;

wherein said lens is operable to substantially collimate light rays input thereinto;

wherein said magnetooptical crystal is operable to receive a magnetic field and to rotate polarization directions of light rays input thereinto by $\pi/8+N\pi/4$, (N=0, 1, . . . );

wherein said first optical fiber is operable to transmit light toward said reflector, and said second optical fiber is operable to receive light;

wherein said first and second optical fibers are disposed such that the light transmitted from said first optical fiber does not pass through a half-wave plate until after the light has been reflected by said reflector, after which the light passes through said half-wave plate and said birefringent crystal and into said second optical fiber;

wherein said lens has an end face which is obliquely polished;

wherein said first and second optical fibers constitute at least part of an optical fiber array having at a tip end thereof a plurality of aligned optical fiber tip ends; and wherein said tip end of said optical fiber array has an obliquely polished end face, said obliquely polished end face of said optical fiber array being disposed in parallel with said obliquely polished end face of said lens and having an optical axis in parallel with said obliquely polished end face of said lens, and said obliquely polished end face of said optical fiber array confronting said obliquely polished end face of said lens across said birefringent crystal and said half-wave plate.

5. An optical component as recited in claim 4, wherein said lens comprises a grin rod lens.

6. An optical component comprising:

first and second optical fibers;

a reflector;

a birefringent crystal disposed between said reflector and said first and second optical fibers;

a lens disposed between said reflector and said birefringent crystal;

a magnetooptical crystal disposed between said reflector and said lens;

a half-wave plate disposed between said lens and said birefringent crystal in a location between said lens and said second optical fiber, no half-wave plate being disposed between said lens and said first optical fiber;

a glass plate disposed between said lens and said birefringent crystal in a location between said lens and said first optical fiber, said glass plate having a thickness substantially equal to a thickness of said half-wave plate;

wherein said lens is operable to substantially collimate light rays input thereinto; and wherein said magnetooptical crystal is operable to receive a magnetic field and to rotate polarization directions of light rays input thereinto by $\pi/8+N\pi/4$, (N=0, 1, ... ).

7. An optical component comprising:

first and second optical fibers;

a reflector;

a birefringent crystal disposed between said reflector and said first and second optical fibers;

a lens disposed between said reflector and said birefringent crystal;

a magnetooptical crystal disposed between said reflector and said lens;

a half-wave plate disposed between said lens and said birefringent crystal;

wherein said lens is operable to substantially collimate light rays input thereinto;

wherein said magnetooptical crystal is operable to receive a magnetic field and to rotate polarization directions of light rays input thereinto by $\pi/8+N\pi/4$, (N=0, 1, ... );

wherein said first optical fiber is operable to transmit light toward said reflector, and said second optical fiber is operable to receive light;

wherein said first and second optical fibers are disposed such that the light transmitted from said first optical fiber passes through said half-wave plate and into said second optical fiber after the light has been reflected by said reflector;

wherein said lens has an end face which is obliquely polished;

wherein said first and second optical fibers constitute at least part of an optical fiber array having at a tip end thereof a plurality of aligned optical fiber tip ends; and wherein said tip end of said optical fiber array has an obliquely polished end face, said obliquely polished end face of said optical fiber array being disposed in parallel with said obliquely polished end face of said lens and having an optical axis in parallel with said obliquely polished end face of said lens, and said obliquely polished end face of said optical fiber array confronting said obliquely polished end face of said lens across said birefringent crystal and said half-wave plate.

8. An optical component as recited in claim 7, wherein said lens comprises a grin rod lens.

* * * * *

UNITED STATES PATENT AND TRADEMARK OFFICE
CERTIFICATE OF CORRECTION

PATENT NO. : 5,499,132
DATED : March 12, 1996
INVENTOR(S) : Masaaki TOJO et al.

It is certified that error appears in the above-indentified patent and that said Letters Patent is hereby corrected as shown below:

Title page item [21] and below item [73] insert the following:

--[*] Notice: The portion of the term of this patent subsequent to May 5, 2013 has been disclaimed.--

In item [45] on the front page, "Date of Patent: March 12, 1996" should read --Date of Patent: *March 12, 1996--.

Signed and Sealed this

Fifteenth Day of October, 1996

Attest:

BRUCE LEHMAN

Attesting Officer   Commissioner of Patents and Trademarks